(12) United States Patent
Bell, Jr.

(10) Patent No.: US 6,431,628 B1
(45) Date of Patent: Aug. 13, 2002

(54) MOBILE PIZZA KITCHEN

(75) Inventor: Richard A. Bell, Jr., St. Louis, MO (US)

(73) Assignee: Kbell Pizza Enterprises, L.L.C.A., St. Louis, MO (US)

( * ) Notice: Subject to any disclaimer, the term of this patent is extended or adjusted under 35 U.S.C. 154(b) by 0 days.

(21) Appl. No.: 09/638,595

(22) Filed: Aug. 15, 2000

(51) Int. Cl.[7] .................................................. B60P 3/05
(52) U.S. Cl. ........................ 296/24.1; 296/22; 99/339; 99/446; 52/79.1
(58) Field of Search .................... 296/24.1, 22; 99/339, 99/446, 349; 52/79.1

(56) References Cited

U.S. PATENT DOCUMENTS

| | | |
|---|---|---|
| 4,556,046 A | 12/1985 | Riffel et al. |
| 4,632,836 A * | 12/1986 | Abbott et al. .................. 296/22 |
| 4,643,167 A | 2/1987 | Brewer |
| 4,912,338 A * | 3/1990 | Bingham .................... 296/24.1 |
| 4,919,477 A * | 4/1990 | Bingham et al. ........... 296/24.1 |
| 4,924,763 A * | 5/1990 | Bingham ....................... 99/339 |
| 5,255,664 A * | 10/1993 | Gurliacci ...................... 99/446 |
| 5,285,604 A * | 2/1994 | Carlin .......................... 52/79.1 |
| 5,958,271 A | 9/1999 | Westerberg et al. |
| 5,990,454 A | 11/1999 | Westerberg et al. |
| 6,011,242 A | 1/2000 | Westerberg |
| 6,026,738 A * | 2/2000 | Charles et al. ................. 99/349 |
| 6,069,345 A | 5/2000 | Westerberg |

* cited by examiner

Primary Examiner—Kiran B. Patel
(74) Attorney, Agent, or Firm—Blackwell Sanders Peper Martin LLP

(57) ABSTRACT

A mobile pizza kitchen utilizes a pickup truck with a camper shell that covers the cargo bed. A radiation type intermittently operated oven and refrigerated case are located in the bed and covered by the shell. A clutched AC generator is installed under the hood of the truck and is driven by a serpentine belt connected to the engine. The electricity from this generator is used to power the oven, refrigerated case and other equipment. One type of oven that is suitable for this mobile pizza kitchen utilizes quartz halogen lights which produce ultraviolet and infrared radiation. In order to cook pizza, the driver must exit the cabin of the vehicle and open the tailgate and the rear door of the shell. Cooking occurs while the vehicle is stopped. The oven and the case are vented to atmosphere to prevent overheating of the rear compartment. The engine of the truck is left on while cooking so that the generator can produce electricity for the oven and the refrigerated case. In an alternative embodiment, a diesel generator is located in the cargo bed of the truck. In yet another alternative embodiment, the oven and refrigerated case are located in the cabin of a van and the generator is located on a special carrier frame mounted on a hitch at the rear of the van. In another alternative embodiment, the oven and refrigerated case are located in the cabin of a van and an AC generator driven by the engine's serpentine belt, is located under the hood. The van, like the pickup truck, utilizes a radiation type oven and cooking occurs while the van is stopped. Both the pickup truck and the van are designed to be operated by one individual who drives it from place to place and cooks hot pizza on location.

8 Claims, 10 Drawing Sheets

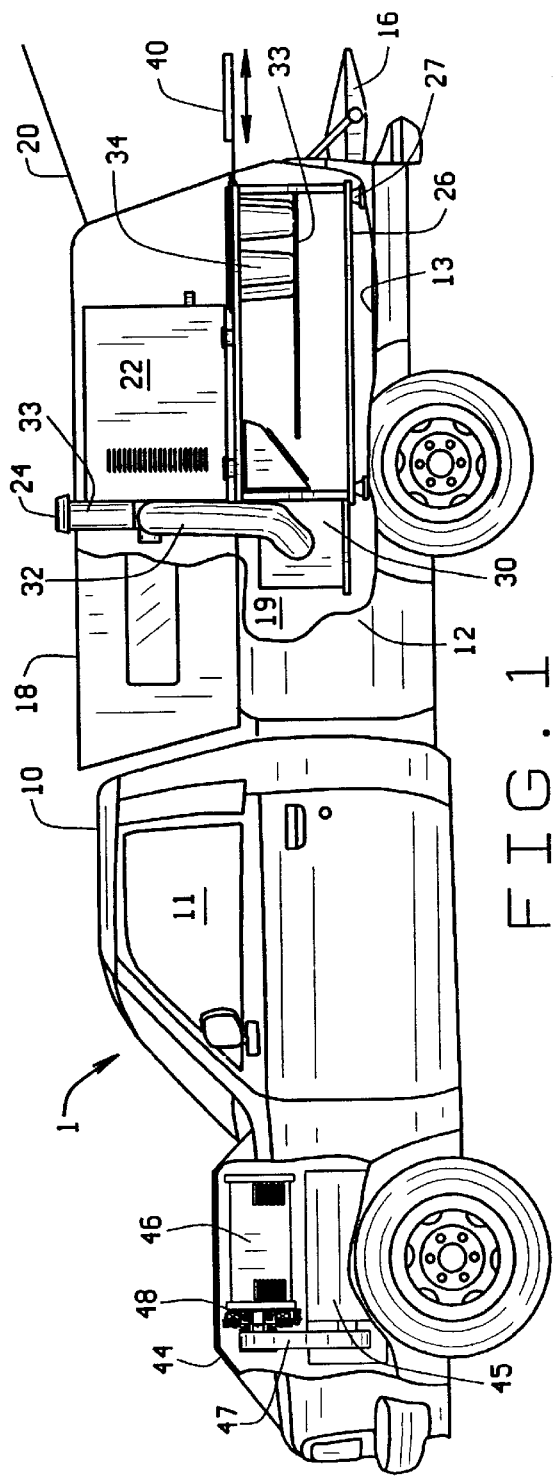
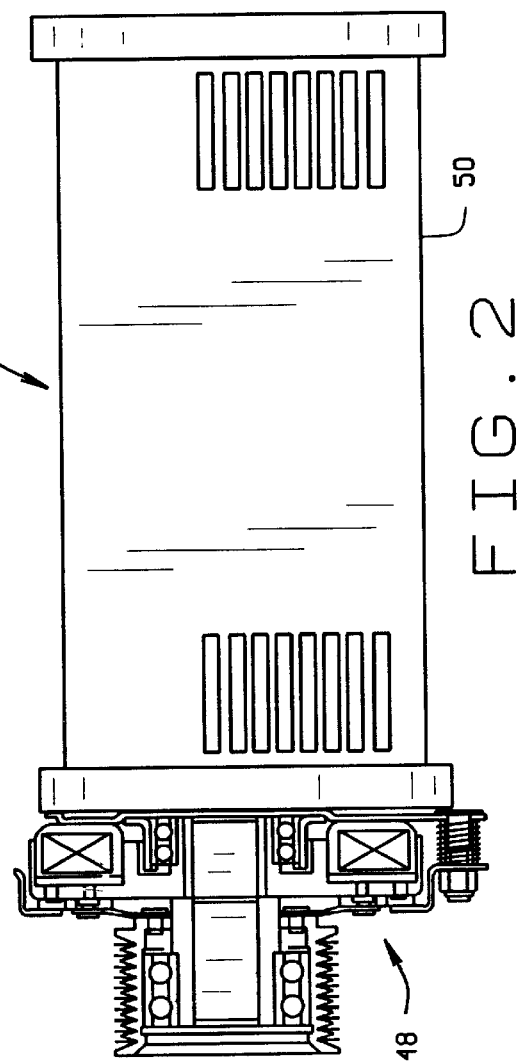

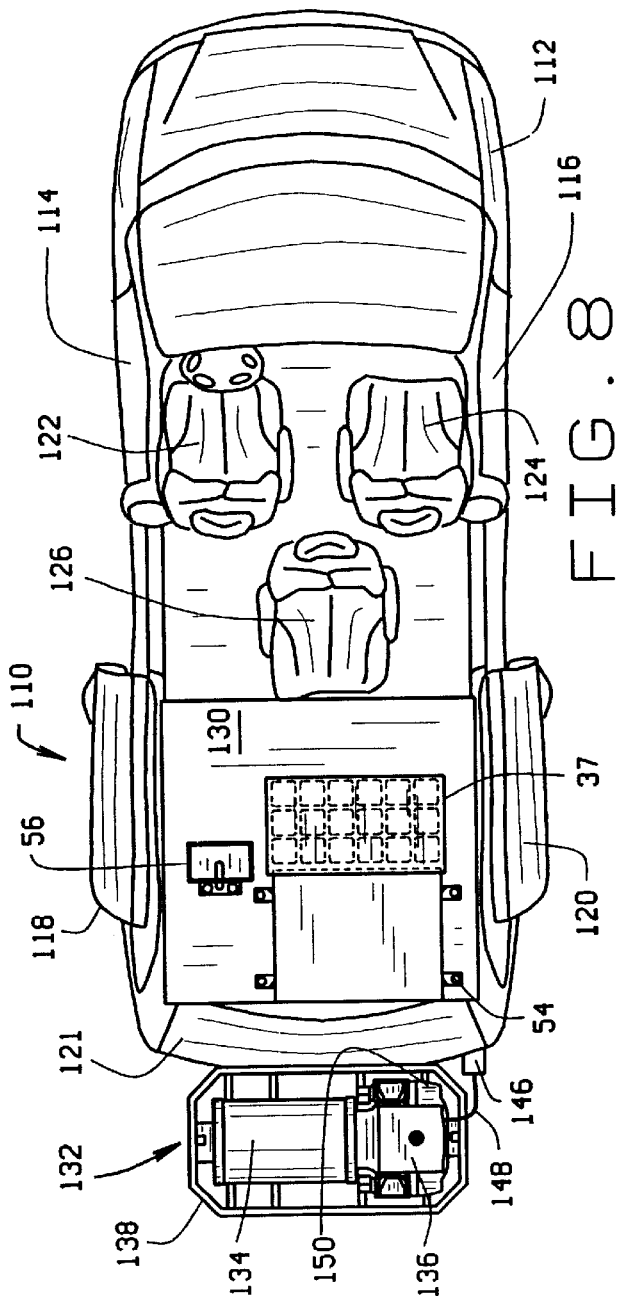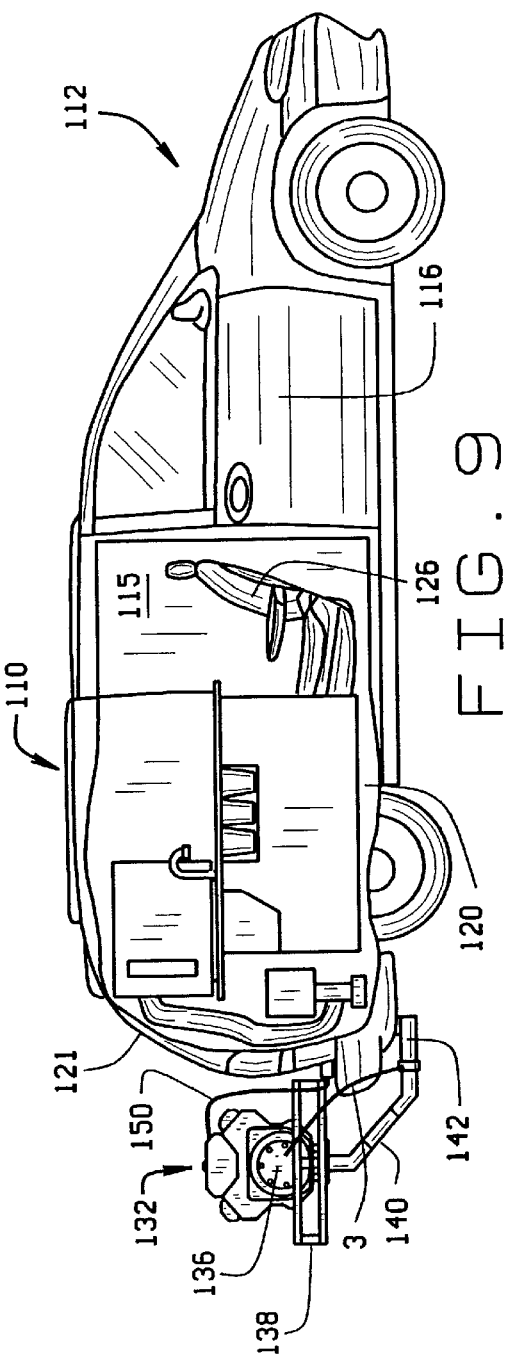

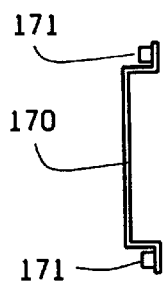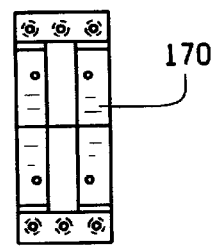
FIG. 16A    FIG. 16B
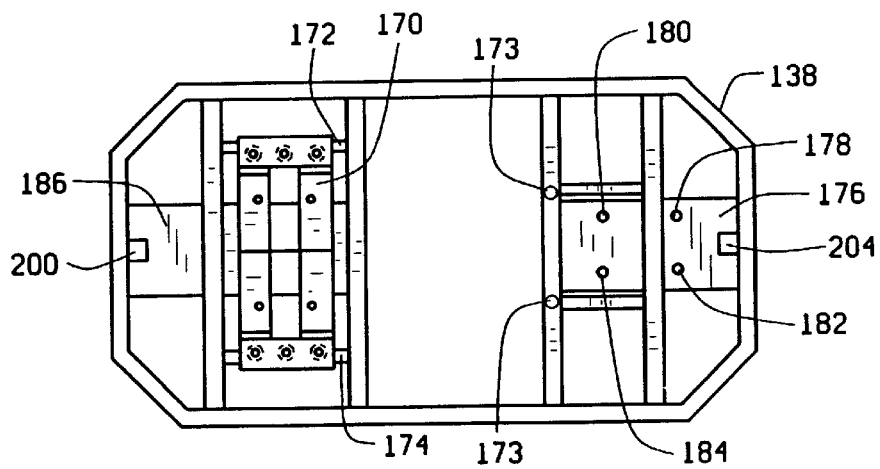
FIG. 17
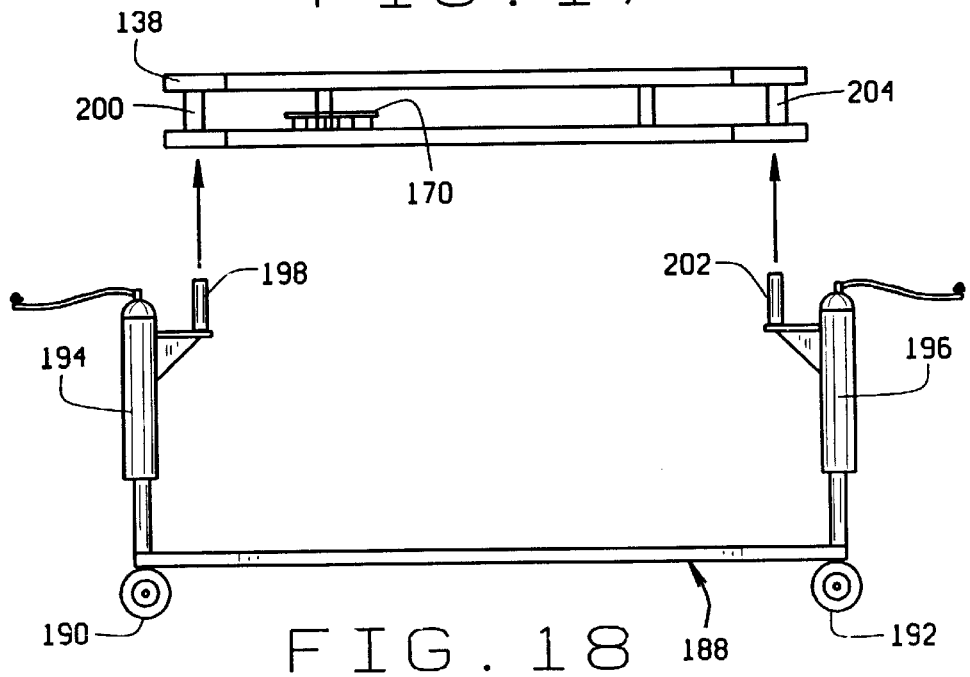
FIG. 18

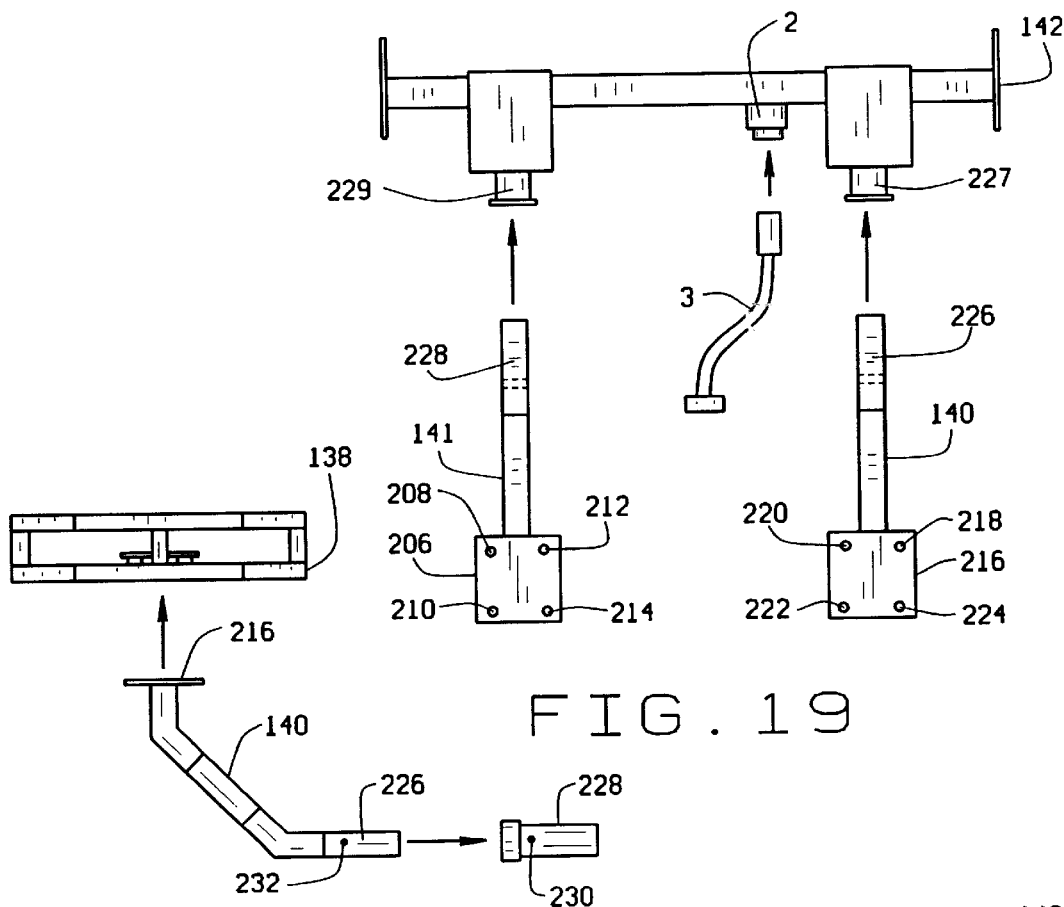
FIG. 19
FIG. 20
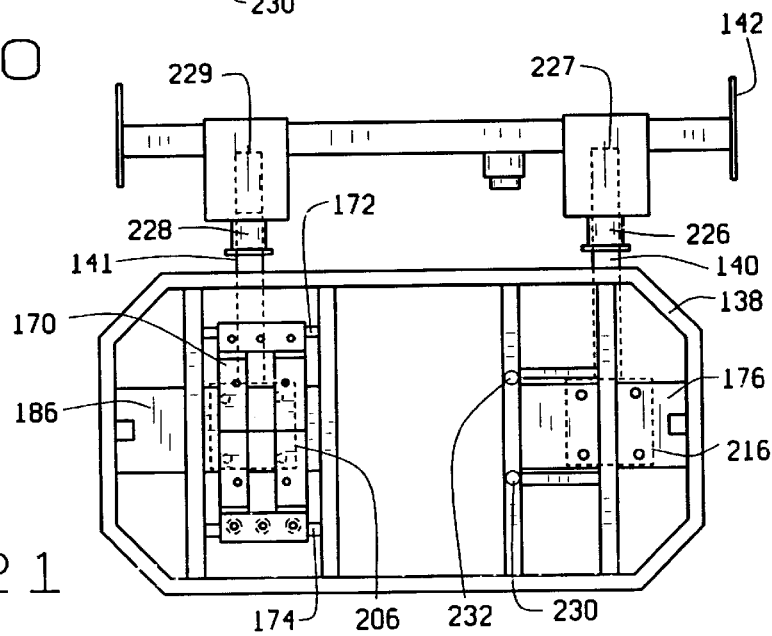
FIG. 21

MOBILE PIZZA KITCHEN

BACKGROUND OF THE INVENTION

1. Field of the Invention

The present invention relates to pizza preparation and delivery vehicles.

2. Brief Description of the Prior Art.

Pizza is ubiquitous in American culture and is immensely popular among younger consumers. Pizza can be obtained in a variety of different ways. It can be cooked at home from scratch or a frozen pizza can be conveniently slipped in the oven. Some frozen pizzas now feature self-rising crust. There are numerous pizza restaurants across America, some of which are members of a national franchise such as Pizza Hut® or Little Caesar's,®. Some of these pizza restaurants offer hand-thrown fresh crust; others use par-baked crusts.

Most dine-in pizza restaurants use a gas-fired or electric tunnel oven with a conveyor belt to move the pizza through the tunnel. Because the inlet and the outlet of tunnel type ovens is open, a tremendous amount of heat is often lost in the kitchen and requires an exhaust hood to keep the temperature of the kitchen to a manageable level. In addition, these ovens are normally kept at a minimum baseline temperature which is substantially above ambient temperature when they are not cooking pizza. This allows the oven to reach cooking temperatures of 500° F. or more without substantial warm-up time. Many of the tunnel ovens used in pizza restaurants are not particularly fuel-efficient because they must maintain this base line temperature and because of energy losses during cooking at the inlet and outlet of the tunnel. Most tunnel type ovens use blowers to impinge hot air on the top and bottom of the pizza. (These are convection type ovens.)

Another popular way for consumers to obtain pizza is delivery, at home, in the college dormitory, hotel room, or office. Domino'® pizza is a well-known national franchise that specializes in delivering pizza. Other national franchises and independent restaurants also deliver pizza. Consumers demand hot pizza and they like to have it delivered as quickly as possible after an order has been placed.

A typical delivery business will include a kitchen located in a strip center or other convenience suburban location, with a belt driven tunnel oven. When an order is placed over the telephone, fax or email, the cook typically assembles the pizza on a par-baked crust. After the pizza is run through the tunnel oven and is cooked, it is cut and placed in a box.

The delivery person then typically places the hot boxed pizza in some sort of heat retentive package and drives to the consumers location at home, at the college dorm, etc. The goal is to deliver hot pizza as quickly as possible.

Various attempts have been made to design a mobile pizza kitchen to eliminate the need for the pizza kitchen at a fixed location. For example, U.S. Pat. No. 4,632,836 assigned to Pizza Hut, Inc. describes a pizza preparation and delivery system which eliminates the need for a fixed pizza kitchen. This system uses a commissary or home base to service a fleet of vehicles, each of which can cook and deliver pizza. Customers place orders with the home base which dispatches the vehicles to the customers' location. The vehicle disclosed in this patent is a Ford® E350 Truck with a van body mounted on the rear. This system used a driver and a cook to accomplish different tasks. The oven is a conveyor type with a belt. The applicant recommended a WEAR EVER IMPINGER™ oven from Lincoln Manufacturing. A separate 110/220 volt AC generator was necessary to power the oven, the refrigerated case and other components in this system. The applicants in this prior art design recommend use of a 15 KW generator operated at 1800 RPM from Onan Corporation. Because of the heat generated by the oven, a hood is provided, which is the subject of U.S. Pat. No. 4,556,046.

The pizza crust in U.S. Pat. No. 4,632,836 was partially assembled before transit, preferably by covering the proofed dough with a layer of sauce and a layer of cheese, before storing it in the refrigerated case. Assembly and cooking of the pizza is completed by the pizza cook while the vehicle is in transit to the delivery destination. The preferred cooking temperature is about 490° to 510° F. and the preferred cooking time is about 10–12 minutes for 13" and 15" pizzas. The temperature and time could be varied from about 450° to 550° F. and from about 6–15 minutes. The purchase, operating and maintenance costs of the components in U.S. Pat. No. 4,632,836 ran higher than what was desirable. One factor adding to these costs was the gasoline or propane fueled generator which was included on the vehicles to supply the power needs of the refrigerated case and oven. Not only did this generator add to the purchase, operating, and maintenance costs of the vehicle, it also increased vehicle noise.

Another problem with the system disclosed in U.S. Pat. No. 4,632,836 is oven ventilation. Tunnel type conveyor belt pizza ovens typically operate at temperatures of 500° F. and require a substantial ventilation hood because of the heat that is lost from this type of an oven at the inlet and the outlet. U.S. Pat. No. 4,643,167 also assigned to Pizza Hut, Inc. discloses an oven ventilation system for use in a pizza delivery vehicle. The oven ventilation system of this patent is described as an improvement to the ventilation system disclosed in U.S. Pat. No. 4,632,836.

By the time U.S. patent application Ser. No. 718,894 (U.S. Pat. No. 4,643,167) was filed, the preferred vehicle had been downsized from the Ford® E350 Truck with attached van body to a typical full-size van, such as the Ford "Econoline®." The kitchen layout was the same in U.S. Pat. No. 4,643,167 as in the predecessor, U.S. Pat. No. 4,632,836. That is, the new vehicle included a driver's station and a kitchen area with a cook's chair and a tunnel type, conveyor oven. The new vehicle also included a separate electrical generator.

U.S. Pat. No. 4,643,167 recommended use of an impingement type oven modified for use with LP Gas burners rather than electrical heating elements. This oven was designed with an average output of about 3,000 B.T.U. and operates with a consumption of about 1 lb. of LP gas per hour. The oven does not have a flue, but rather relies on the open slots to exhaust the combustion products into the oven ventilation system described in the patent.

Although using this smaller van resulted in a reduction of the purchase price, operating and maintenance costs, market pressures still motivated the search for a vehicle that would be less expensive to purchase, operate and maintain. In particular, it was critical to minimize the costs of this new mobile preparation and delivery system so that an operator could offer pizza at competitive prices, while achieving the same or higher profit levels as one could achieve in a conventional pizza restaurant or delivery business.

U.S. Pat. No. 4,919,477, also assigned to Pizza Hut, Inc., describes yet another attempt to deliver a compact pizza preparation and delivery vehicle. This prior art patent utilizes a small pickup truck, such as a Ford Range®, Model "Regular Cab 2-wheel drive." This would generally be considered a "mini-pickup". This pickup truck had a payload capacity of approximately 1600 pounds and a gross vehicle weight restriction of approximately 4,000 pounds. The cargo bed of the truck is approximately 77 inches long and 54 inches wide. The engine is a 2.3 liter, 4 cylinder design. The patent recommends that the original alternator that comes from the manufacturers with this engine be replaced by a heavy duty alternator such as the one sold by Lestek Manufacturing under the designation 9135P.F. which was rated for 135 amps. The preferred oven is an impingement oven wherein heated air is impelled by high-speed fans or blowers towards the top and bottom of the pizza. This is a convection type oven. The oven was of a special design using two separate chambers to allow two pizzas to be cooked simultaneously. The doors of this special oven were equipped with actuators which would automatically open the doors and bring the baked pizza out of the oven when it was cooked. This prior art patent contemplates that pizza will be cooked while the vehicle is in transit. These specially equipped doors with actuators were believed to be advantageous because it would prevent the pizza from becoming overcooked if the driver was unable to stop the vehicle or if the driver is away from the vehicle making another delivery at the conclusion of the baking cycle. In order to expedite cooking, the pizza shells were preferably covered with pizza sauce and a first layer of cheese before being loaded into the vehicle. The proximity of hot pizza and the driver's body could result in accidental burns.

The applicants in this prior art patent recognized that one of the design challenges was the oven. In particular, it was necessary to provide an oven which took up little space, required little electric power, and provided for efficient baking of the pizzas. Another challenge was the ventilation system. The topper or camper shell over the cargo bed of the pickup truck included at least 4 vent ports to prevent overheating of the rear compartment.

This prior art patent had two receiving areas for the pizza pans so that a separate pan could be used to cook each pizza. It also discloses use of a hot water tank and hand pump-operated sink for sanitation purposes.

The pizza preparation and delivery system disclosed in U.S. Pat. No. 4,919,477 included a fleet of vehicles which worked from a common home base. The home base is adapted to receive pizza delivery orders from customers. The home base then dispatches the orders to the appropriate vehicle. Preferably, the particular vehicle to receive the order is selected on the basis of its current location as well as the current inventory on the vehicle. The patent teaches that selection can be made manually, or it can be made by means of a microcomputer with appropriate software and input data. Preferably, the order is sent to the vehicle over the radio and converted directly into a printed delivery order ticket as described above. Alternatively, the orders can be sent over a voice communications system. A separate commissary can be established to supply the pizza shells and toppings for the vehicles.

These prior art patents describe an array of different and complicated designs, yet a need still exists for an economical and commercially viable pizza preparation and delivery vehicle. The ovens and equipment in these prior art patents are still overly complicated, inefficient and uneconomical to operate. The continuous heat generated from these ovens is at best, difficult to deal with in the rear compartment of a mini pickup truck.

In 1997, the present applicant began experimentation with new designs for a pizza preparation and delivery vehicle. Applicant purchased a 1997 Dodge Grand Caravan® with dual sliding doors van, an electric Flashbake™ oven, a Kohler® 22 horsepower engine and a 12.5 KV Gillette® alternator. The Kohler® engine and the alternator were combined to produce an AC generator. Both the Flashbake™ oven and the generator were located inside of the cabin of the van without any ventilation. In order to cook pizza with this design, the rear door, and the two sliding doors needed to be opened to provide sufficient ventilation for the operator. The Kohler® engine was air-cooled, so it produced a lot of heat in the van as well as exhaust fumes from the muffler. Likewise, the Flashbake™ oven, when in operation, produced heat which was not vented outside the van. This design made it difficult at best, for the operator to prepare pizza. This early prototype includes a wooden case without refrigeration to hold pizza crusts, pizza toppings and beverages. The unrefrigerated case was unsuitable for keeping the toppings, crusts and beverages cold.

Throughout 1998 and 1999, the present applicant continued to experiment with different designs. In the summer of 1999, the applicant developed a metal refrigerated case with an evaporator and condensing unit. The condensing unit generates heat and was vented to atmosphere through a duct which connected to a vent in the floor of the van. The Flashbake™ oven was likewise connected to a separate duct which was vented to atmosphere through a vent in the floor of the van. This solved some, but not all of the problems.

In the summer of 1999, applicant completed a design which included a generator mounted on a carrier frame at the rear of the van. The carrier frame mounted on two support arms which fitted into a trailer hitch produced by EAZ-LIFT of Sun Valley, Calif., that has been modified for this specific purpose. This unique arrangement, developed by applicant, located the Kohler® air-cooled engine outside the van so that the rear door could be closed at all times during transit and while cooking. The heat and exhaust fumes generated by the engine did not find their way into the cabin inside the van because the generator was located outside the vehicle, thus solving all heat related problems.

After further consideration, the present applicant determined that use of a mini-pickup truck would be more economical than a van. In addition, it would be more desirable to have a belt driven generator located under the hood of the truck rather than having to fabricate a special carrier frame that connected to a specially modified hitch.

Applicant has therefore developed several designs that are more economical to assemble and/or operate than those disclosed in prior art patents. Many of the old problems have been addressed because a generator can be located under the hood of the mini-pickup truck which can be driven by the serpentine belt on the engine. The Flashbake™ oven uses quartz halogen lights to produce radiant energy which contacts both the top and the bottom of the pizza. The pizza is placed on an open rack in the oven rather than a conventional pan. Other types of radiation ovens are also within the scope of this invention.

The present Flashbake™ oven can cook an assembled 16" or 17" pizza with a par-baked crust in less than two minutes, at approximately 600° F. Maximum throughput might be in excess of 25 pizzas per hour. After the pizza has been cooked, the quartz halogen lights turn off and the Flashbake™ oven quickly returns to ambient temperatures, when not in use. The quartz halogen lights in the Flashbake oven produce both ultraviolet and infrared radiation to cook the pizza without significantly warming the surrounding air. The present invention is more economical to purchase, operate and maintain than designs shown in prior art patents, as it is simpler in design, safer to operate, and possesses a higher throughput and quicker cook time.

SUMMARY OF THE INVENTION

A mini pickup truck is fitted with a camper shell or topper over the cargo bed to define a rear compartment. A refrigerated case and a radiant type oven are positioned in the rear compartment and are accessed by lowering the tailgate and raising the rear door of the shell. The refrigerated case holds par-baked pizza shells that may be pre-coated with sauce and cheese, pizza toppings and beverages. The condensing unit of the refrigerated case is connected by a duct and vented to atmosphere through a vent located on the top of the shell. The radiation type oven is likewise connected to this duct and is vented to atmosphere through the vent located on the top of the camper shell. The radiation oven using quartz halogen lights which emit ultraviolet and infrared radiation to cook the pizza. The lights draw energy only when the oven is cooking and do not directly heat the oven's atmosphere or interior. When the lights are switched off, the oven quickly returns to ambient temperatures.

An AC generator can be located under the hood of the vehicle and can be driven by the serpentine belt from the engine. This generator produces enough electricity to operate the oven, a refrigerated case and other auxiliary equipment. In the alternative, a diesel generator can be placed in the cargo bed of the mini-pickup truck to produce electricity for the oven and refrigerated case. In an alternative embodiment, the oven and refrigerated case are positioned in the cabin of a van. The generator is located on a carrier frame outside of the cabin. This generator likewise produces enough electricity to run the oven and the refrigerated case. In an alternative embodiment, a generator can be transversely mounted in line with the engine crankshaft under the hood of the van and can be driven by the serpentine belt from the engine. Both of these generators produce enough electricity to run the oven, the refrigerated case and auxiliary equipment. These generators produce alternating current and are fitted to the vehicle in addition to the conventional alternator found on most internal combustion engines. In other words, the mini-pickup truck and van is equipped with a alternator, and an AC generator.

BRIEF DESCRIPTION OF THE DRAWINGS

FIG. 1 is a side elevation view of a mobile pizza kitchen, including a mini-pickup truck with a camper shell or topper over the cargo bed and a generator under the hood. A portion of the shell and side panel is cut away to show the oven and refrigerated case. A portion of the hood is cut away to show the generator and the truck engine.

FIG. 2 is an enlarged side elevation view of the generator and electric clutch in FIG. 1.

FIG. 8 is a top view of a second alternative embodiment of the mobile pizza kitchen, including a van and exterior generator. The top of the van has been removed to show the seats, the oven and the refrigerated case the second alternative embodiment and components are also shown in FIGS. 9 and 11–21.

FIG. 9 is a side elevation view of the mobile pizza kitchen of FIG. 8, with the sliding passenger side door in the open position.

FIG. 16A is a side elevation view and top view of the motor mount vibration isolator and rubber mounts.

FIG. 16B is a top view of the motor mount vibration isolator.

FIG. 17 is a top view of the carrier frame and motor mount vibration isolator.

FIG. 18 is a side elevation view of the carrier frame and rolling stand.

FIG. 19 is a top view of the hitch and support arms prior to insertion of the arms in the hitch.

FIG. 20 is a side elevation exploded view of the carrier frame, support arms and receiver tubes prior to connection of these components.

FIG. 21 is a top view of the carrier frame, support arms and hitch connected together.

DESCRIPTION OF THE PREFERRED EMBODIMENT

Figure 3:
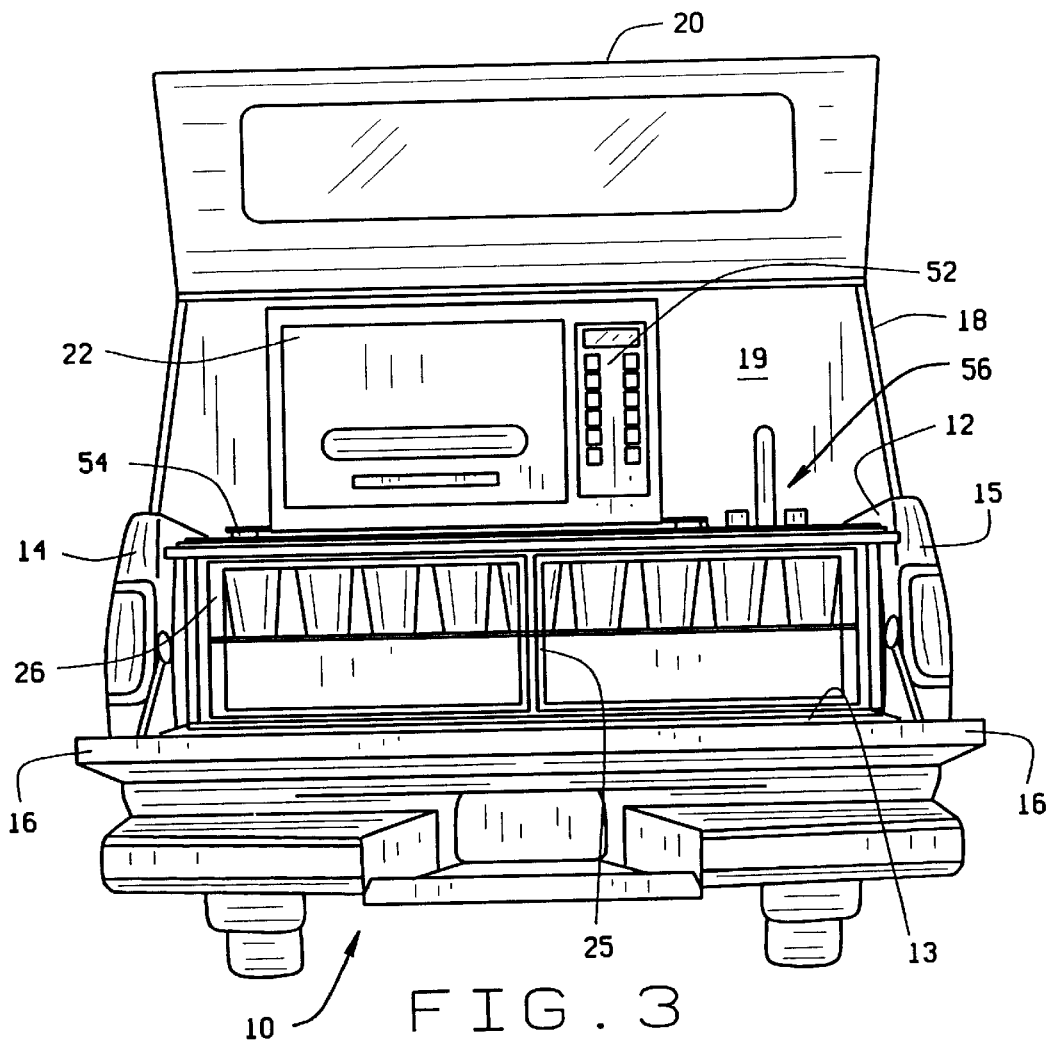
FIG. 3 is a rear elevation view of the mobile pizza kitchen, with the tailgate and shell door open allowing access to the oven and refrigerated case.

FIG. 1 is a side elevation view of a mobile pizza kitchen, including a mini-pickup truck with a camper shell or topper over the cargo bed and a generator under the hood. The numeral 1 generally identifies the mobile pizza kitchen, which uses a mini-pickup truck 10 such as a Mazda® B3000 one ton pickup with 3.0 L V-6 engine. Other types of pickup trucks, including mid-size and full-size pickup trucks may also be used for this invention; however, the mini-pickup truck is preferred because it is more economical to purchase, maintain and operate. The pickup truck 10 includes a cabin 11 for the driver, not shown. At the rear of the pickup truck is a cargo bed 12 with a floor 13 and sidewalls 14 and 15. At the rear of the cargo bed 12 is a tailgate 16, shown in the open or down position in FIG. 1. The cargo bed 12 is covered and enclosed by a camper shell 18, sometimes referred to as a topper, with a rear door 20, at the rear. The rear door 20 in FIG. 1 is shown in the open position. The shell 18 and the cargo bed 12 define a rear compartment 19. Inside the rear compartment 19 is an oven 22, which is mounted facing rearward on a refrigerated case 26, which is attached to the floor 13 of the cargo bed 12 by a plurality of vibration isolators 27.

Applicant recommends a radiation type oven for this invention and has determined that a model VFB12-Counter Electric Flashbake Oven, from Vulcan-Hart Company of Louisville, Ky. is suitable. The Flashbake oven (commonly known as a lightwave oven) utilizes quartz halogen lights which radiate ultraviolet, visible and infrared radiation to the top and bottom of the pizza. The surface of the pizza absorbs this radiation directly which causes it to cook. The rest of the interior of the cooking chamber absorbs little or none of this radiation. The pizza sits on a rotating rack, rather than a pan, so that virtually all surfaces will be evenly exposed to the radiated energy. During operation, the Flashbake™ oven can achieve temperatures in excess of 500° F. While not in operation, the lights go off and the Flashbake oven's interior quickly returns to ambient temperatures in the rear compartment 19. Unlike other ovens, no preheating is required. It is unnecessary to maintain a baseline temperature in between cooking cycles.

The refrigerated case 26 is cooled by an evaporating unit 28 and a condensing unit 30. Applicant has found that Model SRC17AE, modular twin-fan evaporator from Heathcraft Refrigeration Products of Stone Mountain, Ga. and a model AEA9423EXAXB, one quarter-horse power, air-cooled, hermetic condensing unit, from Tecumseh Products Company of Tecumseh, Mich., are suitable for use in this application. However, other evaporators and condensing units may also be suitable. The condenser 30, also commonly referred to as a coil, is connected through a duct 32, to a vent 24, located on the top of the shell 18. The vent 24 allows hot air from the condenser 30 to be vented to atmosphere, outside the rear compartment 19, so that the rear compartment does not become overheated. Likewise, the oven 22 has an exhaust duct 33 that connects to the vent 24. Hot air and odors from the cooking process exit the oven 22 through the duct 33 and are vented to atmosphere through the vent 24.

In order for the driver/cook to gain access to the oven 22 and the refrigerated case 26, he must open the rear door 20 and the tailgate 16, as shown in FIG. 1. A plurality of pizza topping containers 34 are positioned on a rack 33. A shelf 36 is positioned in the refrigerated compartment 38 of the refrigerated case 26. The plurality of containers 34 contain various types of pizza toppings, including, but not limited to, cheese, pepperoni, olives, sausage, onions, bacon, peppers, mushrooms, etc. The refrigerated compartment 38 of the refrigerated case 26 is kept between 33° F. and 38° F. by the evaporating unit 28, the condensing unit 30 and a thermostat, not shown. Additional containers for toppings, pizza crusts and beverages can be stored in the refrigerated compartment 38 of the refrigerated case 26. In order for the operator to gain access to the containers 34 for the various pizza toppings, a sliding shelf 40 must be pulled away, as shown by the arrow in the drawing, from the top of the refrigerated cabinet. The operator then assembles the pizza on the extended shelf 40 and places it in the oven 22. The shelf 40 is then slid back over the containers 34 to keep them covered and to help keep them cool. In FIG. 1, the shelf 40 is shown in the extended position, allowing access to the containers 34.

At the front of the pickup truck 10 is an engine 45 covered by a hood 44. As well known to those skilled in the art, a typical engine 45 includes a serpentine belt 47 that is driven by a flywheel or pulley extending from the engine 45. This serpentine belt 47 typically powers the power steering pump, not shown, the air conditioning compressor, not shown, and the alternator, not shown, which typically produces DC current. The pickup truck 10 of the present invention has been modified by the addition of an AC generator 46 under the hood 44. The AC generator 46 includes an electric clutch 48, which is aligned with the serpentine belt 47 of the engine 45. The AC generator 46 therefore is powered by energy from the engine 45 in the pickup truck 10. The electric clutch 48 will be disengaged when the pickup truck 10 is in transit. Therefore, no electricity will be produced by the generator 48 while the pickup truck 10 is in transit. When the pickup truck 10 is stopped and ready to cook pizza, the electric clutch 48 is engaged, thus driving and causing the generator to produce enough electricity to power the oven 22 and the refrigerated case 26. When in transit, an auxiliary battery 70 with a DC to AC power inverter discussed below, powers the refrigerated cabinet 26.

A 12.5 KW alternator from Gillette Manufacturing of Elkhart, Ind., which produces 220 volts, 55 amps of alternating current at 3600 rpm may be suitable for this application. The AC generator 46 powers the oven 22, refrigerated case 26, and all auxiliary accessories. Electrical conductors with a ground fault interrupter (gfci) circuit breaker, not shown, run from the AC generator 46 to the oven 22, the refrigerated case 26 and other equipment. A model 2060 gfci from Applied Power Concepts of Willoughby, Ohio is suitable for this application. Other gfci's may also be suitable. A 3-inch serpentine belt electric clutch, model 509019 from Ogura Industrial of Somerset, N.J., mounted on the AC generator is suitable for use in this application. Other types of clutches, alternators and generators may also be suitable for this application.

FIG. 2 is an enlarged side elevation view of the AC generator 46, including the alternator 50, and the electric clutch 48. In order to cook pizza, the operator must stop the vehicle and exit the cabin 11. The operator then opens the tailgate 16 and the rear door 20 to gain access to the oven 22 and the refrigerated case 26. The engine 45 of the pickup truck 10 will be placed in a "fast idle" (app. 1000–1200 rpm) position using a fast idle solenoid which, when coupled to properly sized pulleys, will result in a 3600 rpm generator shaft speed. This imparts energy to the AC generator 46 to provide the proper voltage to run the oven 22 and the refrigerated case 26.

Figure 6:
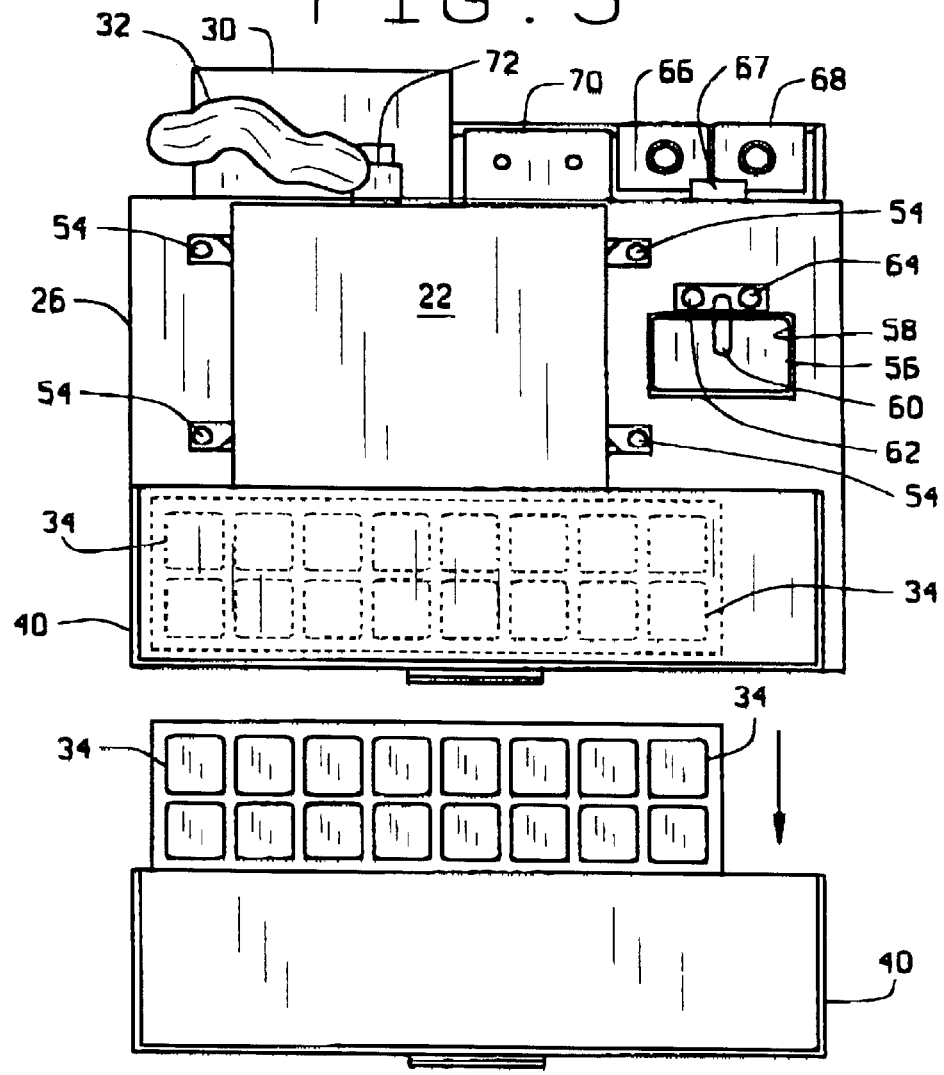
FIG. 6 is a top view of the oven, refrigerated case, wet bar and other components.

FIG. 3 is a rear-elevation view of the mobile pizza kitchen, with the tailgate 16 in the open or down position and rear door 20 in the open or up position, allowing access to the oven 22 and the refrigerated case 26. A control panel 52 is located on the exterior of the oven to control the temperature and time for cooking as well as the function of the generator 46. The oven 22 is mounted on the top of the case 26, by a plurality of vibration isolators 54. A wet bar 56, better seen in FIG. 6, is located in the right rear portion of the case 26; however, the sink 58 of the wet bar 56, is not exposed to refrigerated air. A thermally insulated sliding glass door 25 allows the operator to gain access to the refrigerated compartment 38 of the case 26.

Figure 4:
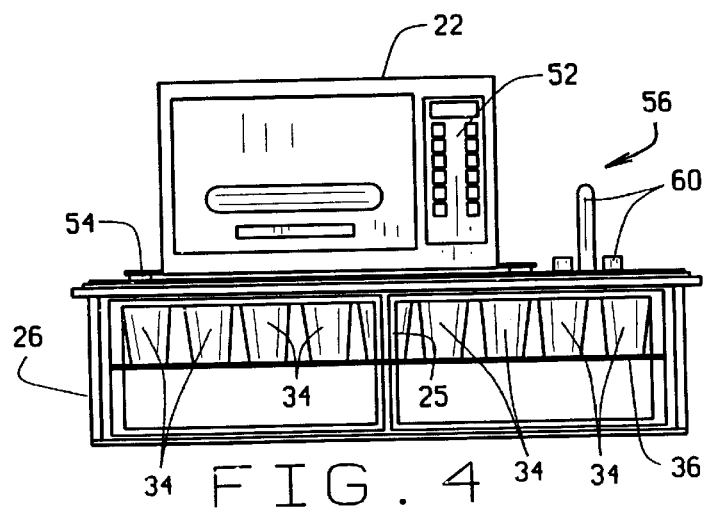
FIG. 4 is a rear elevation view of the oven, refrigerated case and wet bar.

FIG. 4 is a rear-elevation view of the oven 22, refrigerated case 26 and wet bar generally identified by the numeral 56. To gain access to the refrigerated compartment 38 of the refrigerated case 26, the operator moves the sliding glass door 25. The cool area inside the refrigerated compartment 38 is used to store pizza toppings, pizza crusts, beverages and other items. The refrigerated air also contacts the plurality of topping containers 34 to keep the toppings cold. The oven 22 is secured to the top of the refrigerated case 26 by a plurality of vibration isolators 54.

Figure 5:
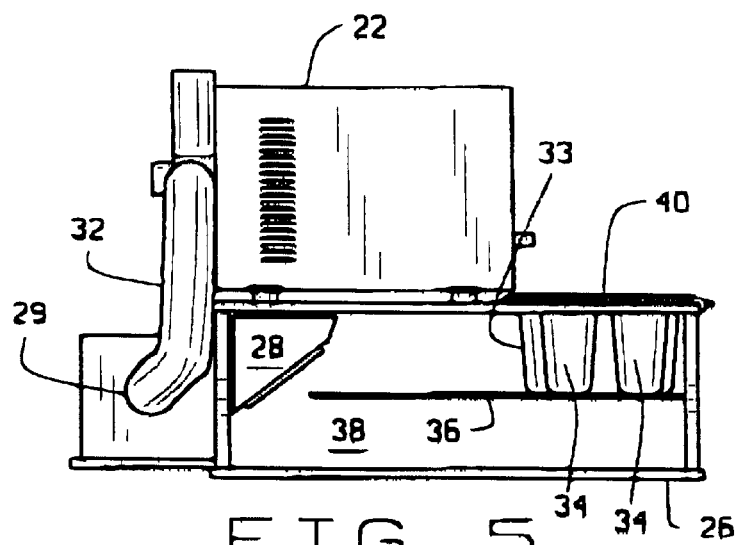
FIG. 5 is a side elevation view of the oven and the refrigerated case. The side of the case is cut away to show the interior refrigerated compartment.

FIG. 5 is a side elevation view of the oven 22 and the refrigerated case 26, with the case shown in cut-away view to expose the interior refrigerated compartment 38. The plurality of topping containers 34 rest on a rack 33. The evaporating unit 28 is located towards the rear of the case 26 and the condensing unit or coil 30, is located outside the refrigerated case 26. The condenser 30 is vented through the ducts 32 and 33 to atmosphere by the vent 24. An exhaust fan 29 is positioned in the duct 32 proximate the condensing unit 30. While the mobile pizza kitchen 1 is in transit, the sliding shelf 40 is in the retracted position as shown in FIG. 5. When retracted, the shelf 40 covers the plurality of pizza topping containers 34. In order to gain access to the plurality of topping containers 34, the operator extends the sliding shelf 40, as shown in FIG. 1.

FIG. 6 is a top view of the oven 22, refrigerated case 26, wet bar 56 and other components. The wet bar 56 includes a sink 58, a spigot 60, a hot water on/off valve 62, and a cold water on/off valve 64. A container 66 holds a potable water supply, which is at ambient temperature. An on demand hot water heater 67 is positioned on the rear of the refrigerated case 26. A pump, not shown, is gravity fed by the potable water container 66. Conduits connect the pump the on demand hot water heater 67 and the hot water valve 62. Other conduits connect the pump directly to the cold water valve 64 so that the wet bar 56 has both hot and cold water. A drain, not shown in the sink 58, connects to a wastewater container 68.

An auxiliary 12-volt DC battery 70 is positioned towards the rear of the refrigerated case 26. The auxiliary 12-volt DC battery 70 utilizes a DC to AC power inverter not shown to power the compressor, the condenser 30 and the evaporator 28 when the AC generator 46 is disengaged. A ProWatt™ 1500 DC to AC power inverter from Statpower of Burnaby, British Columbia is suitable for this purpose. Other inverters may also be suitable. The condensing unit 30 is vented through the duct 32 to the vent 24 to keep the hot air outside of the rear compartment 19. An exhaust blower 72 mounted on the rear of the oven, blows exhaust from the oven 22 to the duct 33 which is connected to the vent 24.

During transit the sliding shelf 40 covers the plurality of topping containers 34, as shown in the upper portion of FIG. 6. When it is time to make pizza, the operator extends the sliding shelf 40 exposing the plurality of topping containers 34, as shown in the lower portion of FIG. 6.

Figure 7:
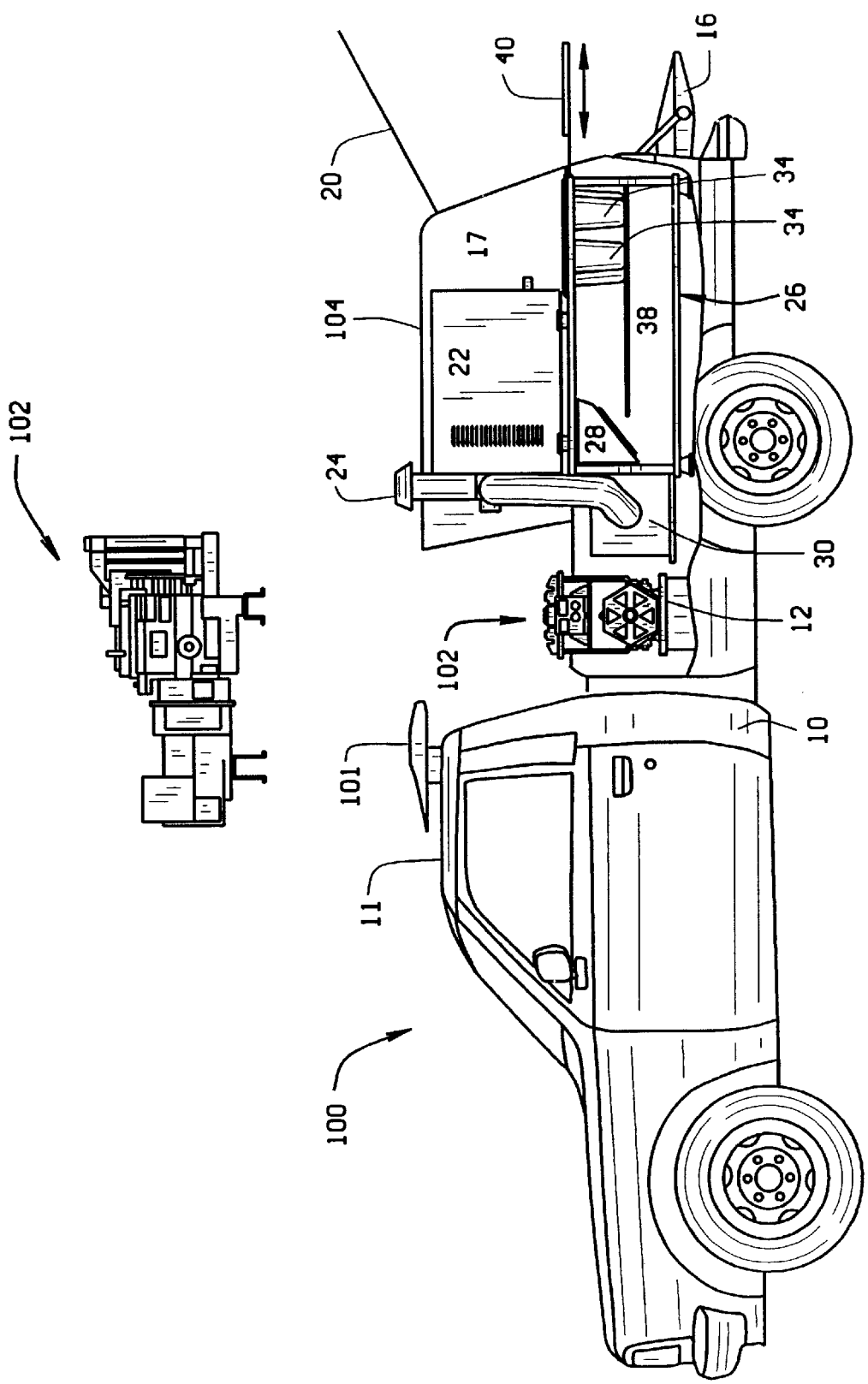
FIG. 7 is a side elevation view of a first alternative embodiment of the mobile pizza kitchen which uses a diesel generator mounted in the cargo bed instead of the generator located under the hood.

FIG. 7 is a side elevation view of an alternative embodiment of the mobile pizza kitchen 100 which uses a diesel generator 102 mounted in the cargo bed 12 instead of the AC generator 46 located under the hood 44 of FIG. 1. Applicant has found that a 15 KW rail mounted diesel genset model 104–22 produced by Perkins of Miami, Fla., is a suitable device for the diesel generator 102. Other diesel gensets may also be suitable.

The mobile pizza kitchen 100 uses a camper shell 104 or topper that is slightly different than the configuration used for the mobile pizza kitchen in FIG. 1. In the alternative embodiment of FIG. 7, the shell 104 has a truncated cover which allows the generator 102 to be freely vented to atmosphere. An air foil 101 is mounted on the top of the cab 11 of the pickup truck 10, to streamline airflow over the cab 11 and the shell 104. The condenser 30 is also vented to atmosphere and is not covered by the shell 104. With these exceptions, the mobile pizza kitchen 100 is the same as the mobile pizza kitchen 1. The truck 10 includes a rear cargo bed 12 that is partially covered by the shell 104. The cargo bed 12 and the rear shell 104 define a real compartment 17.

The oven 22 and the refrigerated case 26 are located in the rear compartment 19. In order to gain access to the oven 22, the operator must open the rear door 20. In order to prepare a pizza, the operator opens the rear door 20 and the tailgate 16. The sliding glass doors 25 of the refrigerated case 26 are opened and a pizza crust is taken out. The crust is par-baked and may be precoated with sauce and a layer of cheese. The sliding shelf 40 is moved from its retracted to its extended position as shown in FIG. 1. The operator places the pizza shell on the sliding shelf 40 and then adds pizza toppings from the plurality of pizza topping containers 34 to the top of the pizza. When the pizza is fully assembled, the operator opens the oven 22 and places the fully assembled pizza on the rack for cooking. (No pans are used.) The sliding shelf 40 is then returned to its retracted position and the plurality of containers for pizza toppings 34 are covered until the next time they are needed. It takes less than 2 minutes to cook a 16-inch pizza in this fashion using radiant energy as the surface temperature of the pizza reaches approximately 600° F. Once the pizza is cooked, it is removed from the oven 22, placed in a box, cut and is delivered hot to the consumer. Before moving on the to next location, the operator must close the rear door 20 to the shell 104 and the tailgate 16 of the cargo bed 12. The operator then drives to the next location, parks the mobile pizza kitchen 1 and repeats the process for cooking 1 or more pizzas.

FIG. 8 is a top view of an alternative design for a mobile pizza kitchen generally identified by the numeral 110. In this alternative embodiment, a van 112 is used as the vehicle instead of the pickup truck 10. The top of the van 112 has been removed in order to better show the layout of the mobile pizza kitchen 110. A van such as a Dodge Grand Caravan® with dual sliding side doors, is suitable for this application.

The van 112 includes a driver access door 114, a passenger access door 116, a sliding driver side door 118 and a sliding passenger side door 120, all of which are shown in the open position in FIG. 8. A rear door 121 is shown in the closed position. Inside the cabin 115 is a drivers seat 122, a passenger seat 124 and the cook's seat 126. A counter 130 is positioned in the rear of the van 112. Mounted on the counter 130 is an oven 22 and a wet bar 56. Underneath the counter 130 is a refrigerated case 26 with dual front sliding glass doors. A plurality of pizza topping containers 34 are positioned in the refrigerated case 26 and are accessible through an opening 128 in the counter 130. A cover 131 slides back and forth over the plurality of pizza topping containers 34. The oven 22 is secured to the counter 130 by a plurality of vibration isolators 54.

At the rear of the vehicle and outside the cabin 115, is a generator generally identified by the numeral 132 which includes a gasoline engine 136 mounted to an alternator 134. Applicant has determined that a 22 horsepower V-twin command series engine, model no. CH22GS from Kohler Company of Kohler, Wisconsin is suitable for the engine 136. Other gasoline engines with similar horsepower outputs may also be sufficient components. Applicant has determined that a 12.5 KW alternator operating at 3600 rpm from Gillette Manufacturing of Elkhart, Ind. is suitable for the alternator 134. Other alternators with similar electrical generating capacity may also be suitable for this component. The generator 132 powers the electric oven 22 and the electric refrigerated case 26. The generator 132 is mounted on a carrier frame 138 using vibration isolators 171.

FIG. 9 is a side elevation view of the mobile pizza kitchen 110 of FIG. 8, with the passenger sliding door 120 in the open position, revealing the cook's seat 126. The passenger access door and the rear door 121 are shown in the closed position.

The generator 132 mounts on a carrier frame 138, which is attached to two support arms, 140 and 141, which engage a hitch 142. The Class IV hitch is a modified model 3250 from EAZ-LIFT Spring Corporation of Sun Valley, Calif. Other hitches may also be suitable for this application.

An engine control receptacle 2 is mounted in the hitch 142. A detachable wiring harness 3 connects the engine control receptacle 2 to the engine 136. This allows the operator to control the operation of the generator 132 through the control panel 52 of the oven 22 in the cabin 115 of the van 112.

A watertight receptacle 146 is mounted in the rear door 121. A watertight plug 148 engages the receptacle 146 on the rear door 121. A detachable wiring harness 150 runs from the water tight plug 148 on one end to the alternator 134 on the other end and conveys electricity from the alternator 134 to the oven 22 and the refrigerated case 26. A Marineco waterproof 50-AMP 240-volt twist lock plug, model no. MRN103R and a receptacle model no. MRN301EL-B available from Marineco Supply of Cape Coral, Fla., are suitable in these applications. Other plugs and receptacles may also be suitable for this application. Other conductors, not shown, transmit the electricity from the receptacle 146 to the oven 22 and the refrigerated case 26.

Figure 10:
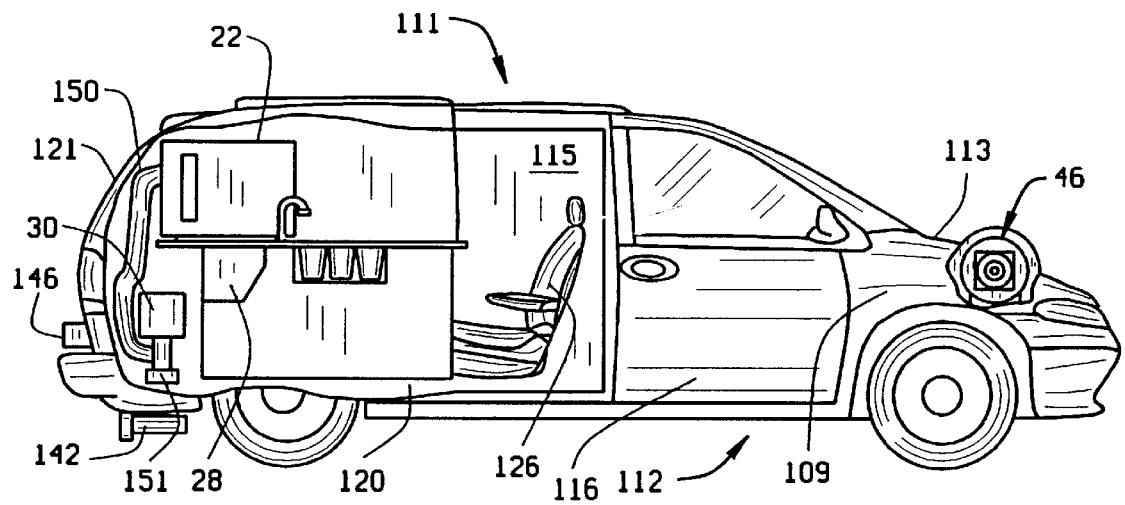
FIG. 10 is a third alternative embodiment of the mobile pizza kitchen, which uses a transverse mounted generator located under the hood, instead of the generator located at the rear of the vehicle.

FIG. 10 is an alternative embodiment of the mobile pizza kitchen 111 that uses a van 112 and a belt driven AC generator 46 instead of the generator 132. As previously discussed, the AC generator 46 includes an alternator 50 and an electric clutch 48. The AC generator 46 is transversely mounted under the hood 113 of the van 112. The electric clutch 48 is aligned with the serpentine belt of the engine and derives its power from the engine 109 of the van 112. To operate the oven 22, the engine of the van must be on so the serpentine belt will rotate and power the AC generator 46 to produce the needed electricity. Properly sized pulleys result in a 3600 rpm generator shaft speed while the engine is revved to a "fast idle" position of 1000–1200 rpm using a fast idle solenoid not shown.

The exhaust from the oven 22 connects to a ventilation duct 150 which connects to a vent 152 in the floor of the van 112. The oven has an exhaust blower 23 connected to the duct 150. Another exhaust fan, not shown, is mounted proximate the vent 152. The vent 152 is open to atmosphere. The condensing unit 30 is connected to a second exhaust duct 164 and a second vent 151 in the floor of the van. A fan, not shown, is located in the duct 164 proximate the vent 151. The vent 151 is open to atmosphere. This allows the hot air from the condensing unit 30 to be vented outside of the cabin 115 of the van 112 through the vent 152 which is located in the floor of the van 112. This prevents the cabin 115 from overheating. Suitable conductors, as well as a ground fault interrupter (GFC1), not showing, connect the oven 22, the evaporator 30 and the AC generator 46.

Figure 11:
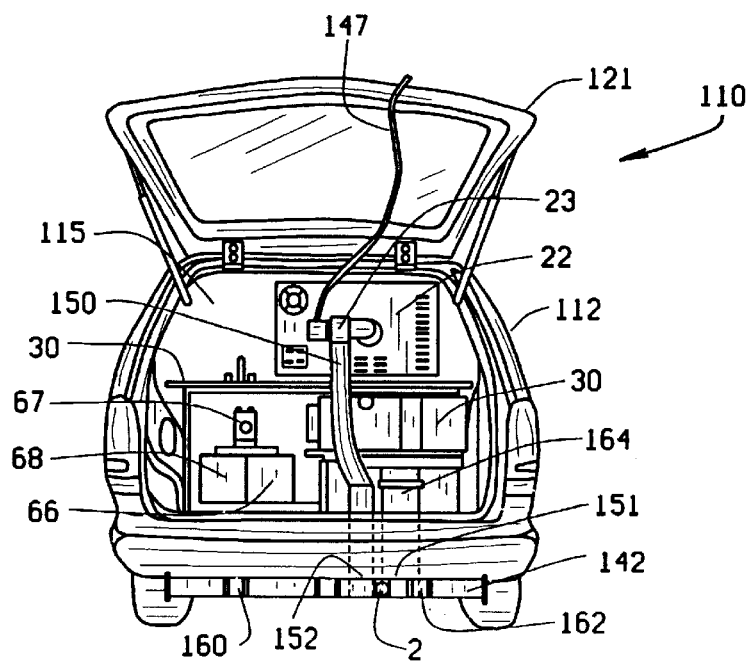
FIG. 11 is a rear elevation view of the second alternative embodiments of the mobile pizza kitchen of FIG. 8, with the generator and rack removed and the rear door open.

FIG. 11 is a rear elevation view of the mobile pizza kitchen 110 of FIG. 8 with the generator 132, carrier frame 138, and support arms 140 and 141 removed from the hitch 142. On the exterior of the rear door is a watertight receptacle 146 previously described. The inside wiring harness 147 connects the receptacle 146 to the oven 22 and evaporator 30. The inside wiring harness 147 carries electricity from the generator 132 to the oven 22 and the evaporator 30.

The rear of the refrigerated case 26 supports a potable water container 66 connected by conduits to the on demand water heater 67 and the hot water valve 62. Another conduit connects the potable water container 66 with the cold water valve 64 of the wet bar 56.

The exhaust from the oven 22 connects to a blower fan 23 which connects to the duct 150, which terminates at the vent 152 in the floor of the van. Exhaust from the oven 22 is carried through the duct 150 to the vent 152, which is open to atmosphere. This prevents overheating of the cabin and eliminates odors from the cooking process. The condenser 30 connects to a separate exhaust duct 164 which likewise connects to a separate vent 166 in the floor of the van 112. Hot air from the condenser 30 moves through the duct 164 and is vented to atmosphere through the vent 166 in the floor of the van 112. The duct 164 and the vent 166 likewise prevent overheating in the cabin 115. The hitch 142 includes two modified receiver tubes 160 and 162 which accept the twin generator support arms. In addition, a control receptacle 146 is mounted in the hitch 142. As previously discussed the engine control receptacle 2 connects to a wiring harness 3, which connects to the engine 136. These connect the wiring harness 3 to the control panel 52, via conductors not shown, thus allowing the operator in cabin 115 to operate both the oven 22 and the generator 132 with the controls 52.

Figure 12:
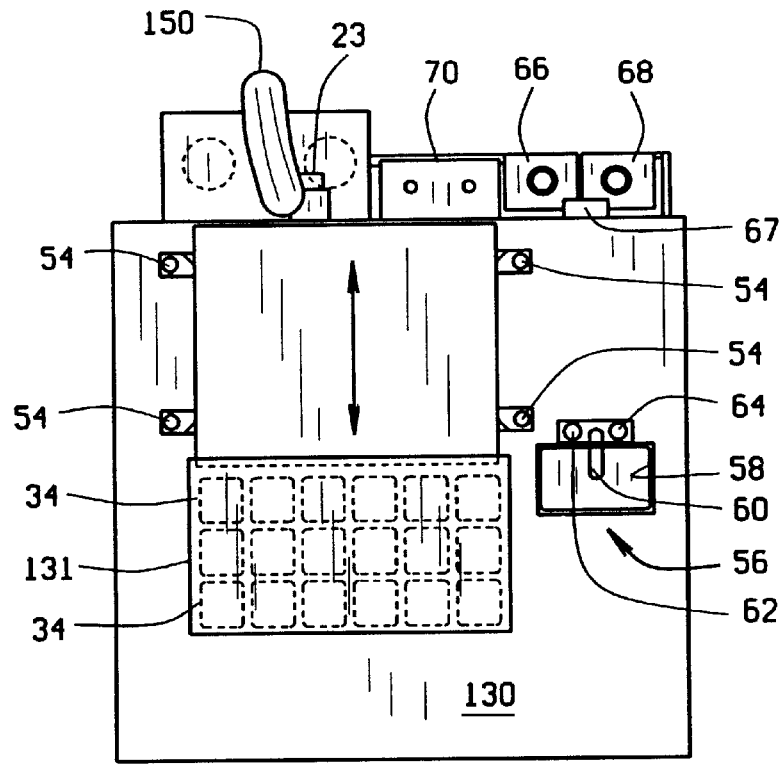
FIG. 12 is a top view of the oven, countertop and other equipment of FIG. 8.

FIG. 12 is a top plan view of the oven 22, the counter top 130 and other equipment. The oven 22 is connected to the counter 130 by a plurality of vibration isolators 54. A wet bar 56 is mounted in the counter 130. The sink 58 of the wet bar 56 is isolated from the refrigerated compartment 38 of the refrigerated case 26. A potable water container 66 is connected via conduits, not shown, to the on demand water heater 67 which is connected to the hot water valve 62 of the wet bar 56. Likewise, the portable water container 66 is connected via conduits, not shown, to the cold water valve 64 in the wet bar 56. Both hot and cold water exit the spigot 60 above the sink 58. A drain, not shown, in the bottom of the sink 58 is connected via conduits, not shown, to a wastewater container 68. An auxiliary 12-volt DC battery 70 is mounted on the outside rear of the refrigerated case 26. An exhaust fan 23 at the rear of the oven 22 connects to a duct 150 which vents to atmosphere through the vent 152.

A sliding shelf 131 covers the plurality of topping containers 34 when van 112 is in transit. When it is stopped and the operator is ready to prepare a pizza, the sliding shelf 131 is slid underneath the oven 22, exposing the plurality of pizza topping containers 34. Assembly of the par-baked pizza crust proceeds in the usual manner according to the requirements of the order.

Figure 13:
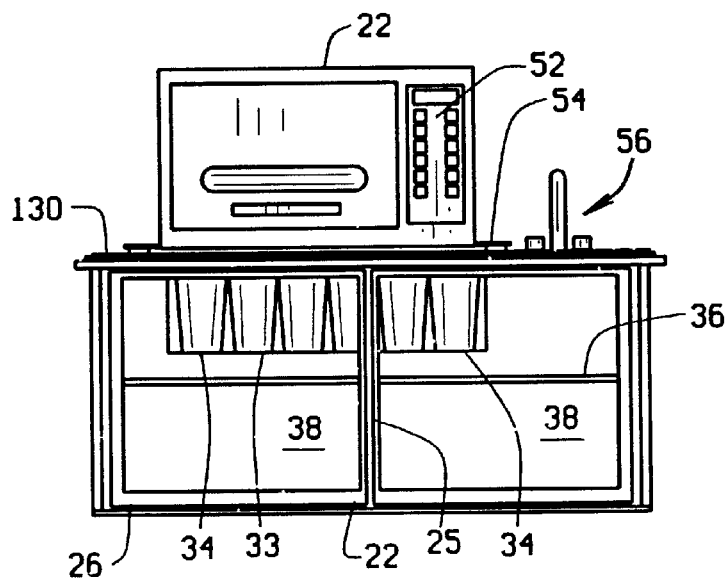
FIG. 13 is a side elevation view of the oven and refrigerated case of FIG. 12.

FIG. 13 is a side elevation view of the oven 22 and the refrigerated case 26 of FIG. 12. The oven 22 mounts on the countertop 130 with a plurality of vibration isolators 54. A control panel 52 is located to the right of the oven 22 to control the baking process and operation of the generator 132 or 46. The wet bar 56 is located to the right of the oven 22.

The refrigerated compartment 38 of the refrigerated case 22 is insulated from ambient temperatures and is kept at a temperature between 33° F. and 38° F. A plurality of pizza topping containers 34 are positioned on a rack 33 in the refrigerated compartment 38 of the refrigerated case 22. The plurality of pizza topping containers 34 are exposed to cooler temperatures inside the refrigerated case 26 to keep the pizza toppings fresh. A rack 36 is also positioned on the compartment 38 of the refrigerated case 26. Sliding glass doors 25 allow access to the compartment 38 of the refrigerated case 26. Beverages, pizza crusts and pizza toppings can be stored on the refrigerated compartment 38 of the refrigerated case 26 to keep them fresh.

Figure 14:
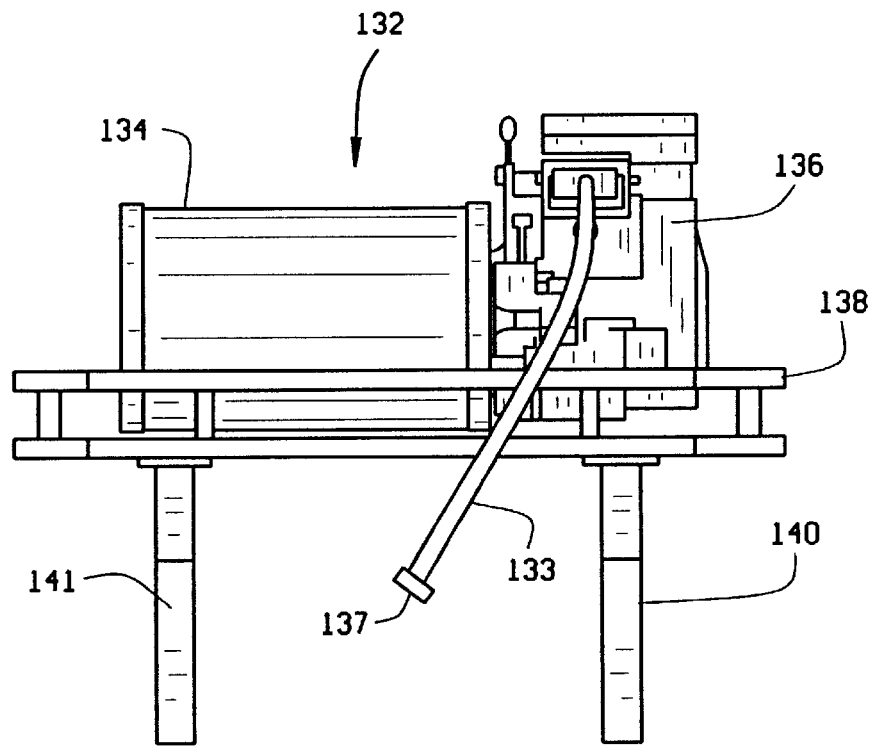
FIG. 14 is a side elevation view of the generator and carrier frame of FIG. 8.

FIG. 14 is a rear elevation view of the generator 132, the carrier frame 138 of FIG. 8 and the support arms 140 and 141. In order to gain access through the rear door 121 to the cabin 115 of the van 112, the generator 132, rack 138 and the support arms 140 and 141 are easily removed from the hitch 142. A fuel line 133 connects to the fuel pump 135 on the motor 136. The other end of the fuel line 133 connects to the vehicle gas tank, not shown, via a quick disconnect fitting 137.

Figure 15:
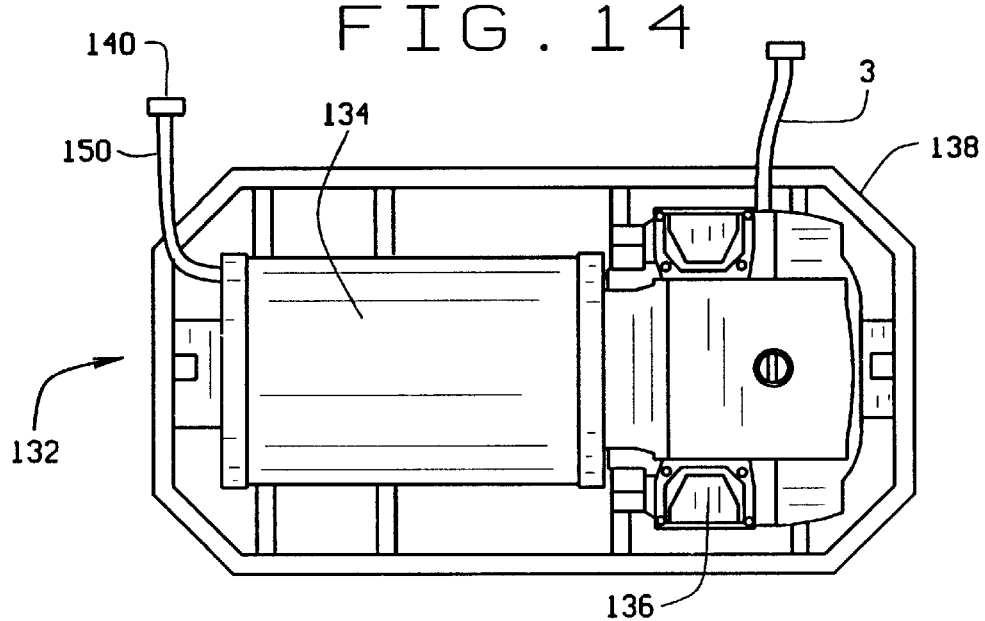
FIG. 15 is a top view of the generator and carrier frame of FIG. 14.

FIG. 15 is a top elevation view of the generator 132 and carrier frame 138 of FIG. 14, without the carrier arms 140 and 141. The generator 132 includes an engine 136 which is typically gasoline driven and an alternator 134 which produces 220 volt alternating current. An outside wiring harness 150 connects to the alternator 134 on one end and the plug 148 on the other end. The detachable wiring harness 3 connects the engine 136 on one end to the engine control receptacle 2 on the other end.

FIG. 16A is a side elevation view of the motor mount 170 and rubber vibration isolators 171.

FIG. 16B is a top plan view of the motor mount 170. The rubber mounts 171 are shown in phantom. The isolators 171 connect the mount 170, which is a steel plate to crossbars 172 and 174 better seen in FIG. 17. A Model K66 rubber mount from Karman Rubber of Akron, Ohio, is suitable for this application. Other mounts may also be suitable.

FIG. 17 is a top plan view of the carrier frame 138 with the motor mount 170 and vibration isolators 171 positioned on the crossbars 172 and 174. The alternator 134 is attached via rubber mounts 173 to the carrier frame 138. A mounting plate 176 is secured to the bottom of the carrier frame 138 and contains 4 holes, 178, 180, 182 and 184. Another mounting plate 186 is located on the opposite side of the carrier frame 138. The other mounting plate 186 likewise has four holes, not shown, positioned in the same fashion as the holes in the mounting plate 176.

FIG. 18 is a side elevation view of the rolling stand 188 which is used to remove and support the carrier frame 138 and the generator 132 when detached from the support arms 140 and 141. The rolling stand 188 includes a plurality of wheels 190 and 192. On opposite ends of the rolling stand 188 are 10-inch trailer screw jacks 194 and 196. Applicant has found that a model 151401 trailer screw jack from Southwest Wheel Company of Dallas, Tex. is suitable for the jacks 194 and 196 in the rolling stand 188. Jacks from other suppliers may also be suitable for this application.

Extending vertically from jack 194 is a carrier stand support arm 198. A similar carrier stand support arm 202 extends from the jack 196. The carrier stand support arm 198 engages a receptacle 200 in the carrier frame 138. Likewise, the carrier stand support arm 202 engages a receptacle 204 in the carrier frame 138. In order to gain access to the cabin 115 of the van 112, it is first necessary to disconnect fuel line 13, and wiring harnesses 150 and 3. Then the generator 132, which is mounted on the carrier frame 138 and the support arms 140 and 141 may be disconnected. Once these components have been removed and detached, the rear door 121 can be opened allowing access to the components mounted inside the cabin 115. In order to remove the generator 132 which remains mounted on the carrier frame 138, one must position the rolling stand 188 underneath the carrier frame 138. The screw jacks are raised so support arms 198 and 202 extend and engage the receptacles 200 and 204. The nuts and bolts through the mounting plates 176 and 186 are then removed. The generator 132 and the carrier frame 138 can then be removed from the carrier support arms 140 and 141.

FIG. 19 is a top view of the hitch 142 and the support arms 140 and 141 prior to insertion of the arms into the receiver tubes 226 and 228 of the hitch 142. The arrows in the drawing show the direction of insertion of the arms 140 and 141 into receiver tubes 226 and 228. On the upper end of support arm 141 is a mounting plate 206 which has holes 208, 210, 212 and 214. These 4 holes align with the 4 holes in the mounting plate 186 of the carrier frame 138.

The support arm 140 has a mounting plate 216 on the top thereof which supports the mounting plate 176 in the carrier frame 138. Mounting plate 216 includes a plurality of holes 218, 220, 222, and 224. These 4 holes align with the holes 178, 180, 184 and 182 respectively, in the mounting plate 176 of the carrier frame 138.

In order to secure the carrier frame 138 to the mounting arms 140 and 141, a bolt is inserted through the hole 178 in the mounting plate 176 and aligned hole 218 in the plate 216. A nut then secures the bolt. Likewise, a bolt is placed through the hole 180 in the plate 176 and the aligned hole 220 in the plate 216 and is secured by a nut. Likewise, a bolt is placed through the hole 184 in the plate 176 and aligned hole 222 in the plate 216 and is secured by a nut. Another bolt is placed through the hole 182 in the plate 176 and the aligned hole 224 in the plate 216 and is secured by a nut. In this fashion, plate 176 is secured to plate 216. A similar array of nuts and bolts is placed through the corresponding holes in the plate 186 in the plate 206 to secure the carrier frame to the support arms 140 and 141.

The bottom end 226 of the support arm 140 is sized and arranged to fit in the receiver 228 of the hitch 142. Likewise, the bottom end 228 of the support arm 141 is sized and arranged to fit in the receiver 226 of the hitch 142. The engine control receptacle 2 is likewise mounted to the hitch 142. The wire harness 3 connects one end to the receptacle 2 and to the engine 136 on the other end.

FIG. 20 is a side elevation exploded view of the carrier frame 138, the support arm 140 and receiver 228 prior to connection of these components. As indicated by the arrows, the support arm plate 216 is bolted to the plate 176 on the carrier frame 138. Once the end portion 226 is inserted into the receiver 228 a pin is inserted through the hole 232 and the hole 230 and is secured by a cotter key.

FIG. 21 is a top view of the carrier frame 138, support arms 140 and 141 and the hitch 142 connected together. The lower end 226 of the support arm 140 is shown in phantom view engaged with the receiver 227. Likewise, the lower end 228 of the support arm 141 is shown in phantom view engaged with receiver 229. The mounting plate 216 is shown in phantom underneath the mounting plate 176. The motor mount 170 is attached to the cross members 172 and 174. The alternator 134 mounts on vibration isolators 230 and 232. The engine 136 mounts on the motor mount 170.

What is claimed is:

1. A mobile pizza kitchen, with a single operator comprising:

a pickup truck having a cabin and a separate cargo bed with a tailgate, the cargo bed covered by a shell with a rear door, the cargo bed and shell defining a rear compartment, the pickup truck having an engine with an alternator;

a lightwave radiation type intermittently operated oven located in the rear compartment, the oven having an exhaust vent to atmosphere;

a refrigerated case containing a plurality of containers for pizza toppings, the case located in the rear compartment, the case including a condenser with an exhaust vent to atmosphere;

an AC generator located in the engine compartment of the pickup truck, the generator being driven by a serpentine belt and producing enough electricity to power the oven and refrigerated case, and more than 2 KW; and the rear door and tailgate allowing the operator access to the refrigerated case and the oven.

2. The apparatus of claim 1 wherein the generator includes an electric clutch powered by a serpentine belt, which is a part of an engine of the pickup truck, the generator and electric clutch located under a hood of the pickup truck.

3. The apparatus of claim 1 further including a wet bar with a sink and spout, a container holding potable water connected to the spout, and a wastewater container connected to the sink.

4. The apparatus of claim 1 wherein said AC generator is driven by an engine of said pickup truck.

5. The apparatus of claim 1 wherein the oven and the refrigerated case face the rear door of the pickup truck.

6. A mobile pizza kitchen, with a single operator comprising:

a pickup truck having a cabin and a separate cargo bed with a tailgate, the cargo bed covered by a shell with a rear door, the cargo bed and shell defining a rear compartment, the pickup truck including an engine having a serpentine belt that drives an alternator;

a lightwave radiation type intermittently operated oven located in the rear compartment, the oven having an exhaust vent to atmosphere;

a refrigerated case containing a plurality of containers for pizza toppings, the case located in the rear compartment, the case including a condenser with an exhaust vent to atmosphere;

an AC generator located in the engine compartment, the generator including an electric clutch powered by the serpentine belt of the engine, the generator producing enough electricity to power the oven and refrigerated case and more than 10 KW; and the rear door and tailgate allowing the operator access to the refrigerated case and the oven.

7. The apparatus of claim 6 further including a wet bar with a sink and spout, a container holding potable water connected to the spot, and a wastewater container connected to the sink.

8. A mobile pizza kitchen, with a single operator comprising:

a mini-pickup truck having a cabin and a separate cargo bed with a tailgate, the cargo bed covered by a shell with a rear door, the cargo bed and shell defining a rear compartment, the pickup truck having an engine with an alternator;

a quartz halogen type intermittently operated oven located in the rear compartment, the oven having an exhaust vent to atmosphere;

a refrigerated case containing a plurality of containers for pizza toppings, the case located in the rear compartment, the case including a condenser with an exhaust vent to atmosphere;

an AC generator located under the hood of the mini-pickup, the generator being driven by a serpentine belt producing enough electricity to power the oven and refrigerate case and more than 10 KW; and the rear door and tailgate allowing the operator access to the refrigerated case and the oven when the mini-pickup truck is stopped.

* * * * *